(12) United States Patent
Nilsson

(10) Patent No.: US 7,801,515 B1
(45) Date of Patent: *Sep. 21, 2010

(54) WIRELESS TELEPHONE COMMUNICATION FOR INDIVIDUAL CALLERS TO CONTACT REMOTE TELEPHONE TERMINALS THROUGH A PUBLIC SWITCHED TELEPHONE NETWORK

(76) Inventor: Byard G. Nilsson, 2065 Santa Margarita Dr., Fallbrook, CA (US) 92028

( * ) Notice: Subject to any disclaimer, the term of this patent is extended or adjusted under 35 U.S.C. 154(b) by 514 days.

This patent is subject to a terminal disclaimer.

(21) Appl. No.: 11/340,173

(22) Filed: Jan. 26, 2006

Related U.S. Application Data

(63) Continuation of application No. 10/626,409, filed on Jul. 24, 2003, now Pat. No. 6,993,321, which is a continuation of application No. 10/120,632, filed on Apr. 11, 2002, now Pat. No. 6,647,255, which is a continuation of application No. 09/685,169, filed on Oct. 10, 2000, now Pat. No. 6,405,029, which is a continuation of application No. 09/465,127, filed on Dec. 16, 1999, now Pat. No. 6,149,353, which is a continuation of application No. 08/878,864, filed on Jun. 19, 1997, now Pat. No. 6,049,710, said application No. 10/626,409 is a continuation-in-part of application No. 09/860,992, filed on May 17, 2001, now Pat. No. 6,917,802.

(51) Int. Cl.
*H04M 3/00* (2006.01)
*H04M 1/00* (2006.01)
*H04M 1/64* (2006.01)

(52) U.S. Cl. .................. 455/419; 455/563; 379/88.03

(58) Field of Classification Search .......... 455/406, 455/408, 563, 419; 379/114.01, 114.14, 379/114.15, 114.16, 114.17, 114.2, 88.03
See application file for complete search history.

(56) References Cited

U.S. PATENT DOCUMENTS

| 3,688,126 A | 8/1972 | Klein ................. 307/116 |
| 4,007,364 A | 2/1977 | Ojima et al. ............ 401/195 |

(Continued)

FOREIGN PATENT DOCUMENTS

WO 96/03001 2/1996

(Continued)

OTHER PUBLICATIONS

Gawrys, G.W., et al., "A New Protocol for Call Handling Functions for the SPC Network," Globecom '82, IEEE Global Telecommunications Conference, Conference Record vol. 2 of 3, Miami, Nov. 29 to Dec. 2, 1982, pp. 735-738.

(Continued)

*Primary Examiner*—George Eng
*Assistant Examiner*—Christopher M Brandt

(57) ABSTRACT

A telecommunication system incorporates individual station instruments simplified by wireless operation, voice dialing, prepaid accounting and out-call operation, all enabled by cooperative system operation including supporting central equipment. Wireless operation of the central equipment involves a multiple port wireless platform along with other units for interfacing a multitude of mobile station instruments simultaneously for interactive audio communication to, regulate control, monitor and record operations of the instruments, and bridge communication with selected remote terminals through the public switched telephone network. Message capability, emergency abort to an operator station and security features supplement the basic system.

24 Claims, 5 Drawing Sheets

U.S. PATENT DOCUMENTS

| | | | |
|---|---|---|---|
| 4,320,256 A | 3/1982 | Freeman | 379/73 |
| 4,475,189 A | 10/1984 | Herr et al. | 379/202.01 |
| 4,596,900 A | 6/1986 | Jackson | 379/102.01 |
| 4,611,094 A | 9/1986 | Asmuth et al. | 379/201 |
| 4,731,811 A | 3/1988 | Dubus | 455/563 |
| 4,829,514 A | 5/1989 | Frimmel, Jr. et al. | 379/88.07 |
| 4,847,818 A * | 7/1989 | Olsen | 368/10 |
| 4,856,066 A | 8/1989 | Lemelson | 704/275 |
| 4,870,686 A | 9/1989 | Gerson et al. | 379/255 |
| 4,879,744 A | 11/1989 | Tasaki et al. | 379/144.01 |
| 4,959,850 A * | 9/1990 | Marui | 455/563 |
| 4,969,180 A | 11/1990 | Watterson et al. | 455/555 |
| 5,042,063 A * | 8/1991 | Sakanishi et al. | 379/88.03 |
| 5,153,902 A | 10/1992 | Buhl et al. | 455/414 |
| 5,195,090 A | 3/1993 | Bolliger et al. | 455/422 |
| 5,203,009 A | 4/1993 | Bogusz et al. | 455/33.1 |
| 5,222,121 A | 6/1993 | Shimada | 379/88.03 |
| 5,274,695 A | 12/1993 | Green | 379/88.02 |
| 5,297,183 A | 3/1994 | Bareis et al. | 455/410 |
| 5,297,194 A | 3/1994 | Hunt et al. | 379/88.02 |
| 5,353,335 A | 10/1994 | D'Urso et al. | 379/114.2 |
| 5,353,336 A | 10/1994 | Hou et al. | 379/88.02 |
| 5,369,685 A | 11/1994 | Kero | 379/88.04 |
| 5,377,256 A | 12/1994 | Franklin et al. | 455/404 |
| 5,420,912 A | 5/1995 | Kopp et al. | 455/563 |
| 5,440,620 A | 8/1995 | Slusky | 379/100.07 |
| 5,450,479 A | 9/1995 | Alesio et al. | 379/142.01 |
| 5,461,664 A | 10/1995 | Cappadona | 455/550 |
| 5,485,505 A | 1/1996 | Norman et al. | 455/419 |
| 5,499,288 A | 3/1996 | Hunt et al. | 379/88.02 |
| 5,509,049 A * | 4/1996 | Peterson | 455/563 |
| 5,509,060 A | 4/1996 | Hall et al. | 379/207.02 |
| 5,541,977 A | 7/1996 | Hodges et al. | 455/411 |
| 5,574,771 A | 11/1996 | Driessen et al. | 455/413 |
| 5,574,772 A * | 11/1996 | Scalisi et al. | 455/565 |
| 5,592,535 A | 1/1997 | Klotz | 455/406 |
| 5,599,204 A | 2/1997 | Glassford | 439/502 |
| 5,602,900 A | 2/1997 | Hattori | 455/550 |
| 5,610,973 A * | 3/1997 | Comer | 455/413 |
| 5,640,689 A | 6/1997 | Rossi | 455/562 |
| 5,652,789 A | 7/1997 | Miner et al. | |
| 5,659,597 A | 8/1997 | Bareis et al. | 455/563 |
| 5,694,455 A * | 12/1997 | Goodman | 455/413 |
| 5,710,813 A | 1/1998 | Terui et al. | 380/275 |
| 5,719,926 A | 2/1998 | Hill | 379/115.02 |
| 5,737,331 A * | 4/1998 | Hoppal et al. | 370/349 |
| 5,754,645 A | 5/1998 | Metroka et al. | 455/90 |
| 5,778,313 A | 7/1998 | Fougnies | 455/406 |
| 5,790,636 A | 8/1998 | Marshall | 379/88.16 |
| 5,797,101 A | 8/1998 | Osmani et al. | 455/551 |
| 5,802,466 A | 9/1998 | Gallant et al. | 455/413 |
| 5,812,945 A | 9/1998 | Hansen et al. | 455/403 |
| 5,815,807 A | 9/1998 | Osmani et al. | 455/407 |
| 5,818,915 A | 10/1998 | Hayes, Jr. et al. | 455/406 |
| 5,826,185 A | 10/1998 | Wise et al. | 455/405 |
| 5,828,738 A | 10/1998 | Spaeth | 379/130 |
| 5,832,371 A | 11/1998 | Thornton | 455/90 |
| 5,835,570 A | 11/1998 | Wattenbarger | 379/88.03 |
| 5,839,058 A | 11/1998 | Phillips et al. | 455/409 |
| 5,845,218 A | 12/1998 | Altschul | 455/565 |
| 5,850,599 A | 12/1998 | Seiderman | 455/406 |
| 5,854,975 A | 12/1998 | Fougnies et al. | 455/408 |
| 5,864,603 A * | 1/1999 | Haavisto et al. | 379/88.01 |
| 5,867,796 A | 2/1999 | Inutsuka | 455/567 |
| 5,870,459 A | 2/1999 | Phillips et al. | 455/406 |
| 5,884,188 A | 3/1999 | Hayes, Jr. | 455/552 |
| 5,946,613 A * | 8/1999 | Hayes, Jr. et al. | 455/406 |
| 5,956,650 A * | 9/1999 | Suzuki et al. | 455/462 |
| 5,963,859 A | 10/1999 | Keating | 455/405 |
| 5,966,654 A | 10/1999 | Croughwell et al. | 455/414 |
| 5,995,926 A | 11/1999 | Gupta et al. | |
| 6,049,710 A | 4/2000 | Nilsson | 455/409 |
| 6,052,579 A * | 4/2000 | McC Estabrook | 455/418 |
| 6,085,080 A | 7/2000 | Rahikainen et al. | 455/403 |
| 6,125,284 A * | 9/2000 | Moore et al. | 455/557 |
| 6,128,514 A * | 10/2000 | Griffith et al. | 455/564 |
| 6,138,036 A | 10/2000 | O'Cinneide | 455/412 |
| 6,149,353 A | 11/2000 | Nilsson | 455/90 |
| 6,154,526 A | 11/2000 | Dahlke et al. | |
| 6,157,848 A | 12/2000 | Bareis et al. | 455/563 |
| 6,167,118 A | 12/2000 | Slivensky | 379/88.03 |
| 6,167,251 A * | 12/2000 | Segal et al. | 455/406 |
| 6,192,255 B1 * | 2/2001 | Lewis et al. | 455/558 |
| 6,198,947 B1 * | 3/2001 | Barber | 455/563 |
| 6,226,532 B1 | 5/2001 | Kim et al. | |
| 6,240,303 B1 * | 5/2001 | Katzur | 455/563 |
| 6,243,596 B1 | 6/2001 | Kikinis | |
| 6,292,675 B1 | 9/2001 | Nilsson | 455/563 |
| 6,298,250 B1 | 10/2001 | Nilsson | 455/569 |
| 6,308,053 B1 | 10/2001 | Nilsson | 455/90 |
| 6,393,304 B1 | 5/2002 | Meche | 379/355.02 |
| 6,400,967 B1 | 6/2002 | Nilsson | 455/563 |
| 6,400,969 B1 | 6/2002 | Yamashita et al. | |
| 6,405,029 B1 | 6/2002 | Nilsson | 455/409 |
| 6,418,328 B1 | 7/2002 | Shon | 379/355.09 |
| 6,473,610 B1 | 10/2002 | Nilsson | 455/406 |
| 6,879,244 B1 * | 4/2005 | Scalisi | 340/7.2 |
| 2002/0065104 A1 * | 5/2002 | Hess et al. | 455/557 |

FOREIGN PATENT DOCUMENTS

WO 99/14928 3/1999

OTHER PUBLICATIONS

Dorros, Irwin, "Evolving Capabilities of the Public Switched Telecommunications Network," Business Communications Review, Jan.-Feb. 1981, pp. 4-11.

\* cited by examiner

WIRELESS TELEPHONE COMMUNICATION FOR INDIVIDUAL CALLERS TO CONTACT REMOTE TELEPHONE TERMINALS THROUGH A PUBLIC SWITCHED TELEPHONE NETWORK

RELATED APPLICATION INFORMATION

This application is a continuation of application Ser. No. 10/626,409 filed Jul. 24, 2003, entitled "Wireless Telephone System With Mobile Instruments for Outgoing Calls (As Amended)" to be issued as U.S. Pat. No. 6,993,321 on Jan. 31, 2006, which is a continuation of application Ser. No. 10/120,632 filed Apr. 11, 2002, entitled "Wireless Telephone System With Mobile Instruments for Outgoing Calls (As Amended)," now U.S. Pat. No. 6,647,255, which is a continuation of application Ser. No. 09/685,169 filed Oct. 10, 2000, entitled "Wireless Prepaid Telephone System With Dispensable Instruments," now U.S. Pat. No. 6,405,029, which is a continuation of application Ser. No. 09/465,127 filed Dec. 16, 1999, entitled "Wireless Prepaid Telephone System With Dispensable Instruments," now U.S. Pat. No. 6,149,353, which is a continuation of application Ser. No. 08/878,864 filed Jun. 19, 1997, entitled "Wireless Prepaid Telephone System With Dispensable Instruments," now U.S. Pat. No. 6,049,710. Also, said application Ser. No. 10/626,409 filed Jul. 24, 2003, entitled "Wireless Telephone System With Mobile Instruments for Outgoing Calls (As Amended)" is a continuation-in-part of application Ser. No. 09/860,992 filed May 17, 2001, entitled "Mobile Keyless Telephone Instruments and Wireless Telecommunication System Having Voice Dialing and Voice Programming Capabilities," which is now U.S. Pat. No. 6,917,802, all are hereby incorporated by reference as if set forth fully herein.

BACKGROUND OF THE INVENTION (1) Field of the Invention

The present invention relates to mobile telecommunication and more specifically to wireless prepaid telephone systems, for example, as indicated below, for traveler, automotive and employee use, including telephone instruments capable of being compact, inexpensive and simple as a result of integral system operation in combination with enhanced central station equipment.

(2) Background Description

In recent years, considerable progress has been made in the development of wireless telephone systems. In that regard, wireless telephone instruments, sometimes called "mobile stations" (MS) have come into widespread use, accommodated for example by geographically defined cells. Although the systems are quite effective, and have considerably enhanced telephone communication, there are areas for improvement.

Typically in wireless systems, individual telephone instruments communicate at an initial level with central equipment, sometimes called "base stations" (BS). Operating with other components as a composite system, the geographically-separate base stations enable mobile telephone instruments to roam through different geographic areas or cells. Thus, from various locations, mobile instruments can access virtually any telephone terminal throughout the entire dial-up telephone network, sometimes called the "public switched telephone network" (PSTN). Furthermore, the users of mobile telephone instruments can roam from one cell to another in the course of a connected call.

Conventionally, a composite mobile telecommunications system includes some form of a switching system, sometimes including a unit called a "mobile switching center" (MSC). The MSC may be provided, along with other structure between the a base station (BS) and the public switched telephone network (PSTN). Accordingly, mobile management is accomplished using well known techniques and structures.

In contemporary systems, individual wireless telephone instruments usually are purchased by users in a transaction that is relatively complex. As part of the purchase transaction, the instrument is activated and numbers are assigned, however, more significantly, a financial commitment must be established for the new owner. Of course, the owner is responsible for the telephone instrument itself, however, responsibility also extends to the telephone service provided for the instrument, e.g. calls charged to the instrument.

Although considerably enhancing telephonic communication and wireless operation, current systems also have considerably increased complications and the risk-of-loss to instrument owners. In that regard, it is noteworthy that conventional wireless telephone instruments have been relatively complex, and consequently quite expensive. Under various promotional schemes, telephone marketing organizations sometimes have offered wireless instruments at a very low cost. Still, alternative charges or commitments usually are imposed. In any event, costs resulting from lost or stolen instruments ultimately must be borne at some level, usually by the consumer.

As suggested above, the risk-of-loss to the owner of a wireless telephone instrument can far exceed the value of the instrument itself. In one aspect, the increased risk involves the threat of a stolen instrument being used to make extensive and costly calls. Adjustments may be made in the billing for such calls, however usually, not without the expense of time and aggravation to instrument owner. Thus, the risk of physical loss presents a nagging annoyance to wireless instrument owners.

The risk of loosing a wireless telephone instrument is compounded by the fact that wireless operation exposes critical information that can be obtained without physical access to a telephone instrument. Such information can be used to charge fraudulent calls to a wireless owner's account. Consequently, even when an instrument never leaves an owners control, the owner may be invoiced for calls fraudulently made from a clone instrument.

Essentially, with possession of certain critical broadcast information, wireless telephone instruments can be fraudulently cloned. That is, persons with sophisticated apparatus can intercept and use critical information that is broadcast during the routine use of a proper instrument to create a clone. The resulting clone may then be used extensively, to make long distance calls that are billed to the account of the cloned instrument. Thus, even with the exercise of great care, the owner of a wireless instrument may face substantial expense and/or inconvenience. Accordingly, a need exists for a system accommodating fewer complications, limited responsibility and restricted potential loss for the owner of a wireless telephone instrument.

In view of their significant value, and their manner of use, wireless telephone instruments ideally could be of a more convenient size. That is, although now very compact, further improvement is desirable, as for storage and carrying. Specifically, a need exists for wireless telephone instruments that can be simply sold and can be carried and stored with greater convenience, as in a pocket, a purse, a child's pack or an automotive compartment.

In view of the various considerations as set out above, it is apparent that a need exists for an improved, relatively less expensive wireless telephone system affording greater convenience and economy, fewer complications and restricted risk of loss for wireless telephone instrument owners.

SUMMARY OF THE INVENTION

In part, the present invention is based on the recognition that a very simple and convenient, yet effective, wireless telephone instrument can be accommodated, by supporting such instruments with a central system that performs certain functions that traditionally are executed by telephone instruments. Generally, in accordance with a disclosed embodiment, a convenient, inexpensive, voice-actuated, out-call only, prepaid, keyless wireless telephone instrument is provided, that involves limited complications, along with limited risk and exposure, for owners.

Essentially, in accordance with the present invention, as illustrated, a wireless, keyless (no traditional telephone keypad) telephone instrument incorporates an earphone, a microphone, a radio transceiver, a battery pack and a control unit, all embodied in a small convenient housing incorporating switching and signaling structures. As illustrated, the instrument is keyless, i.e. void of any numerical keypad.

As disclosed herein, wireless telephone instruments, e.g. cellular, operate as part of a composite system in cooperation with a central station having a multiple-port platform. The ports of the platform accommodate multiple wireless telephone instruments simultaneously. In a disclosed embodiment, the users of wireless telephone instruments are prompted vocally to speak control words as well as message words. Thus, communication by users at wireless telephone instruments, is in the form of voice signals generated from the user's voice.

At a central station, certain voice signals are recognized as numbers (e.g. digits "zero" through "nine") by a voice recognition unit and consequently are converted to a digital form for control and dial-up functions. Words also may be assigned to the star or asterisk (*) and the pound sign (#) signals. Thus, the central station system includes a voice generator, e.g. an audio response unit (ARU), along with the voice recognition unit, e.g. minimally with "number" recognition capability, and a control unit incorporating a memory.

Essentially, in accordance with an embodiment of the present invention, the central station interfaces individual remote wireless telephone instruments. Voice cues or prompts are provided and vocalized numbers (audio) are received to indicate a desired terminal connection as well as to authenticate or verify that a remote instrument is being properly used. If so, the central station determines whether the instrument has adequate pre-paid value to cover a call. Again, if so, the indicated communication is completed through the mobile network and the public network, with the central station monitoring the call to reflect a service charge in the prepaid balance. With reference to current technology, the system elements of the central station may be variously embodied in a mobile network, as by modifying a base station and/or mobile switch center. Accordingly, the system hereof may be variously incorporated in a mobile telecommunications system to accommodate dial-up select communication through a public switched telephone network.

Wireless and keyless telephone instruments in accordance herewith may involve a limited and defined pre-paid value. The simplicity of the instruments enable very compact forms, as in the configuration of a fountain pen. Furthermore, in large production runs, individual instruments may be quite inexpensive, even to the extent of being discardable or disposable. Accordingly, convenient, inexpensive instruments may be produced with defined and relatively small risk of loss. Complications and obligations of ownership also may be relatively few. Various modifications are disclosed to accommodate various alternative structures and processes.

BRIEF DESCRIPTION OF THE DRAWINGS

In the drawings, which constitute a part of this specification, exemplary embodiments of the invention are set forth as follows.

DESCRIPTION OF THE PREFERRED EMBODIMENT

As indicated above, detailed embodiments of the present invention are disclosed herein. However, the embodiments are merely representative, recognizing that a wide variety of disclosed embodiments are possible utilizing a multitude of different techniques and components. Nevertheless, the disclosed embodiments are deemed to afford the best embodiments for purposes of disclosure and to provide a basis for the claims herein which define the scope of the present invention.

Figure 1:
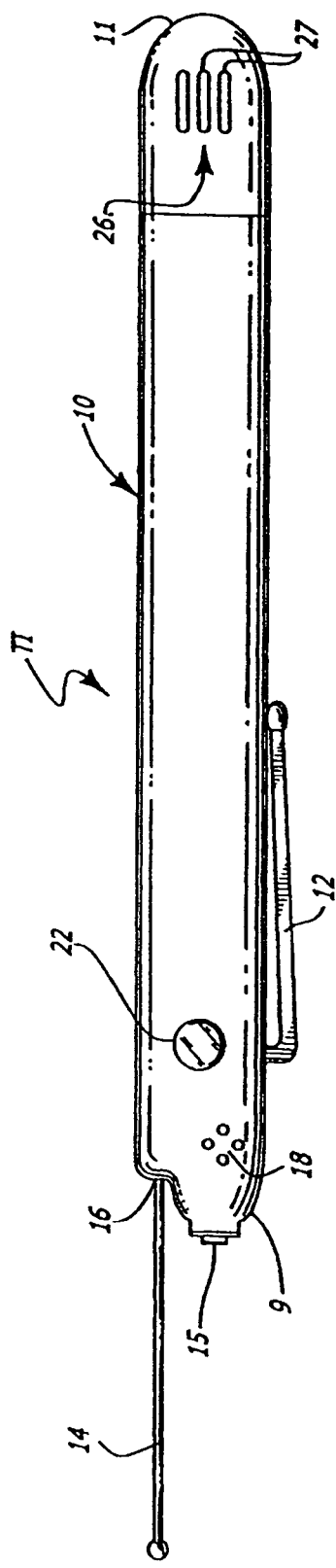
FIG. 1 is a side view showing a wireless mobile telephone instrument in accordance with the present invention and for use in a system in accordance with the present invention.

Referring initially to FIG. 1, a mobile station, or wireless telephone instrument TI is depicted showing some of the operating components. Specifically, the instrument TI is embodied in a tubular housing 10 with somewhat hemispherical ends 9 (left) and 11 to define a configuration that is somewhat similar to that of a writing instrument, e.g. a fountain pen.

Near the end 9 of the housing 10, a pocket clip 12 is affixed to the tubular surface extending parallel to the central axis of the housing 10. The clip may serve as a handle and accommodates convenient attachment of the instrument TI during storage.

Also apparent from the exterior of the housing 10 is an antenna 14 (FIG. 1, upper left) which is telescopically mounted either to be substantially contained in the housing 10 or to extend through a port 16, so that its major length is outside the housing 10. Note that in FIG. 1, the antenna 14 is shown partially extended from the housing 10 while in FIG. 2, it is shown contained in the housing 10.

Figure 2:
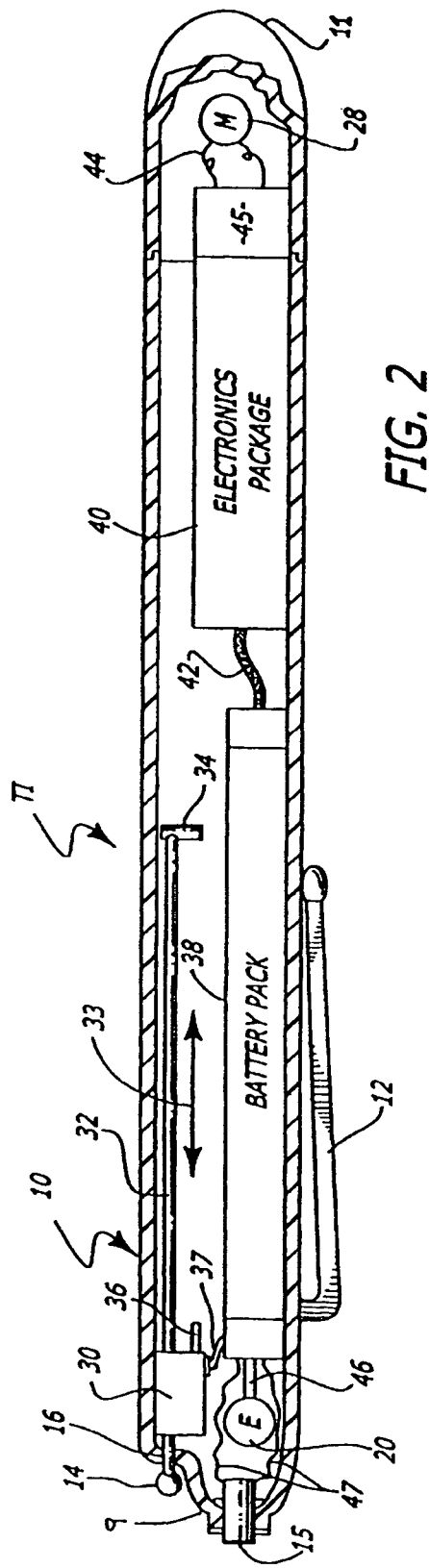
FIG. 2 is a sectional view taken lengthwise through the instrument of FIG. 1.

Near the antenna port 16, at the very tip of the end 9, is a receptacle 15 for a jack (not shown) to recharge the instrument. Somewhat adjacent the receptacle 15, an array of small openings 18 penetrate the housing 10 for passing sound from an earphone 20 (FIG. 2). Mounted near the array of openings 18 is a pilot lamp 22 indicating the alternative states: "on" and "off". The switch structure for setting these states is associated with the antenna 14 and is described later with reference to FIG. 2.

Near the end 11 (FIG. 1, right) a group 26 of slots 27 penetrate the housing 10 for passing a users voice to a microphone 28 (FIG. 2). Thus, the instrument TI is configured to position the microphone 28 near a user's mouth while the earphone 20 is positioned near the user's ear. Note that the pocket clip 12 may be variously placed to attain the most universally convenient location for use as a handle.

The elemental simplicity and convenience of the instrument TI are apparent, both for storage and use. To further consider the instrument TI, reference now will be made to FIG. 2 showing the interior components.

The earphone 20 and the microphone 28, mentioned above, are firmly fixed in relation to the housing 10. A switch device 30 (FIG. 2, left) is configured as a block and also is fixed in the housing 12. The switch device 30 has a dual function, specifically, it actuates the instrument and carries the antenna 14. Structurally, the switch device 30 defines a small bore (not shown) that may be keyed and which telescopically receives an elongate shaft 32 of the antenna 14. Accordingly, the switch device 30 provides a slide bearing to accommodate axial movement of the antenna 14 as indicated by an arrow 33.

When the antenna 14 is withdrawn to extend fully from the housing 10, a knob 34, located at the inner end of the antenna 14, engages a spring-biased plunger 36 extending from the switch device 30. The knob 34 forces the plunger 36 telescopically within the switch device 30 and thereby energizes the instrument TI to an "on" state. Plunger switch devices are well known and widely used in various electronic applications.

Retraction of the antenna 14 releases the spring-biased plunger 36 allowing it to return to the exposed position as illustrated (FIG. 2). Accordingly, the instrument TI is de-energized to an "off" state.

As indicated above, except for the antenna 14, the internal components of the wireless telephone instrument TI are firmly fixed in the housing 10. In such fixed locations, the components are electrically interconnected to accomplish an operating electrical apparatus as described in detail below. Specifically, the switch device 30, along with the antenna 14 are coupled by a cable 37 to a power supply, e.g. battery pack 38 which also is connected to an electronics package 40 by a cable 42. Connections from the electronics package 40 also extend to the microphone 28 (wires 44) and to the earphone 20 (wires 46, partly obscured by the battery pack 38 and carried in the cable 42). The battery pack 38 also is connected to the charging receptacle 15 by wires 47.

The electronics package 40 may comprise an integrated circuit chip (not separately shown) constituting the component electronic parts as described below. These components function cooperatively to execute the process steps and operations of the instrument, also as described below.

Generally, to make a call with the instrument TI, a user simply withdraws the antenna 14 to energize the electrical components including the signal lamp 22 which is illuminated to indicate the instrument is ready for use. With the earphone 20 near the users ear, audible prompts soon are heard instructing the user to respond vocally.

Following preliminary communication with the central station (described below), a communication connection is completed from the instrument TI to a desired remote telephone terminal. A wireless system network and the public switched telephone network accommodate such operation for a multitude of individual wireless telephone instruments TI. Generally, it is noteworthy that various forms of wireless systems are well known in the art into which the developments hereof may be variously incorporated.

Figure 3:
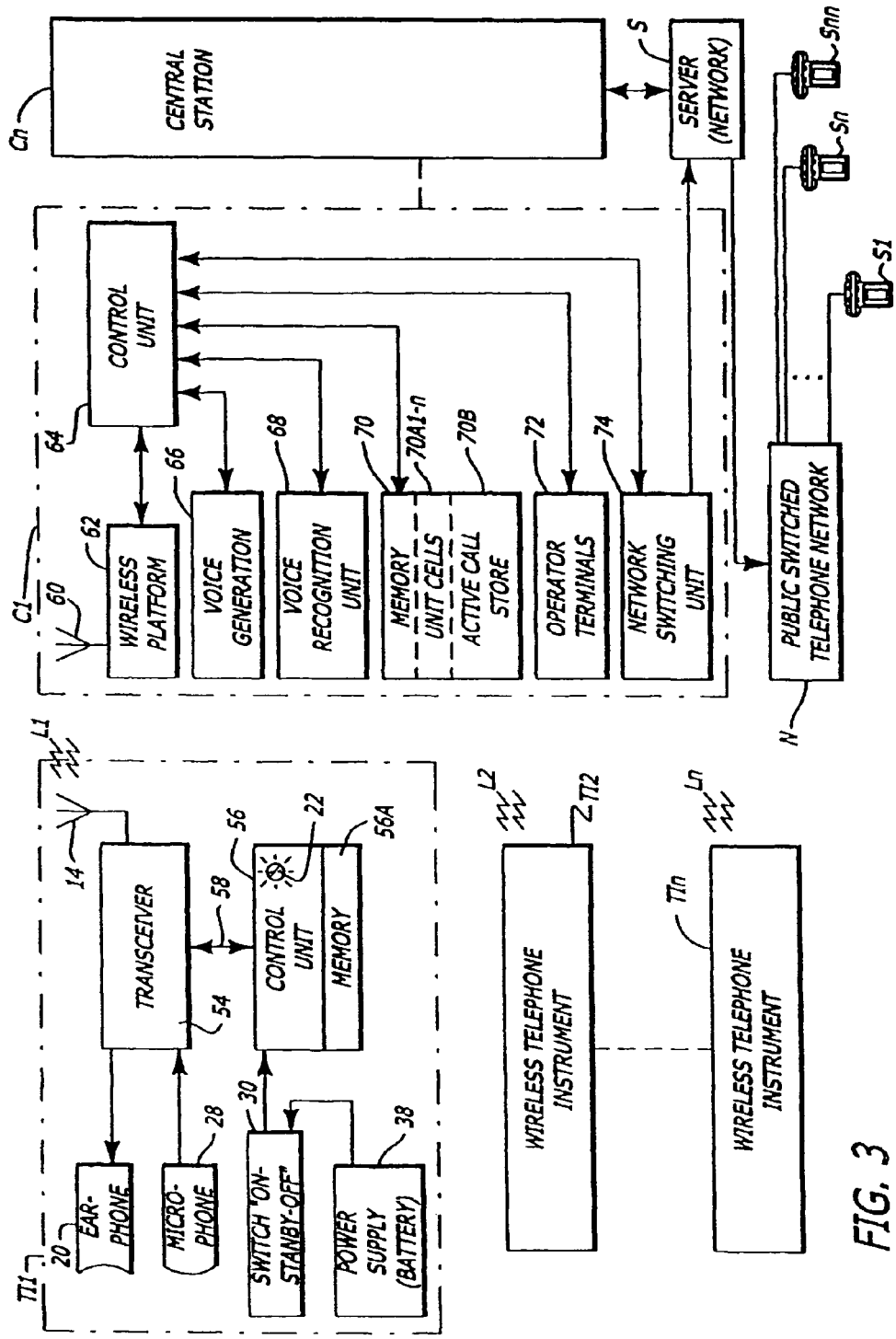
FIG. 3 is a block diagram of a system in accordance with the present invention, showing components of instruments and a central station for use with a public switched telephone network.

Referring now to FIG. 3, a plurality of individual wireless telephone instruments TI1 through TIn are shown (FIG. 3, left). The instruments TI1-TIn may take the physical form of the instrument TI, as described with reference to FIGS. 1 and 2. Essentially, the instruments TI1-TIn are interfaced with a public switched telephone network N (FIG. 3, lower center) through central wireless stations C1 through Cn and a server S in accordance herewith.

Essentially, the stations C1 through Cn function in cooperation with the instruments TI1 through TIn in accordance herewith. Individually, the stations C1-Cn may serve as base radio stations for different geographic areas and may be managed by the server S to accommodate roaming by the instruments TI1-TIn as well known in the art. Details of the wireless management and server functions are well known and consequently are not treated in detail. However, note that the server S may be replicated and that various wireless functions may be performed either in the central stations C1-Cn or in the server S, depending on specific system architecture and design criteria.

As indicated, the central stations C1-Cn are coupled through the server S to the public switched network N. Of course, the public switched telephone network N also is coupled to a multitude of telephone terminals as generally represented by terminals S1 through Sn. As known in the art, any of a wide variety of couplings may be utilized to selectively accomplish the connective functions from the disclosed system herein, through a wireless network and the public network N to the terminals S1-Sn.

In a preliminary manner, consider a routine operation of the system (FIG. 3) by assuming that a user, e.g. the owner of the wireless telephone instrument TI1, is located in an area served by the central stations C1 and wishes to communicate with someone at the telephone station S1, identified by the telephone number 1 213 555 6666.

The user simply withdraws the antenna 14 (FIG. 2) to energize the telephone instrument TI1. As a result, the lamp 22 is illuminated and certain identification signals are transmitted from the instrument TI1 (FIG. 3) to the central station C1. Note that other central stations, as the station Cn, may become involved if the user of the instrument TI1 roams.

After some preliminary processing, as described in detail below, the central station C1 transmits an audio cuing signal to the instrument TI1. As a result, the user hears the earphone 20 provide a vocal instruction or cue for authentication data, e.g. "Please speak the numbers of your instrument code". P1 In response, in the absence of a numerical keypad, the user vocalizes the digits of the code associated with the keyless instrument TI1 (usually treated as secret) e.g. "two, one, three, nine".

Next the user is given pre-paid value information and cued for a called number, e.g. "You now have sixty eight dollars credit. Please speak the digits of the number you are calling".

Responsively, the user again speaks the called number digits, e.g. "one, two, one, three, five, five, five, six, six, six, six", designating the terminal S1.

Typically, the user then hears a ringing signal, presumably a wireless connection is established and communication proceeds in the conventional manner. The communication is monitored to reflect time and charges.

The detailed operation and processes of the composite system are treated below; however, as certain aspects of mobile telecommunication are presently well known they are not explained in detail. For example, various identification methods, broadcast techniques and structures, authentication techniques, calling processes, cellular organizations and mobility managements are well known. Detailed descriptions of such aspects of mobile telecommunications are provided in a book entitled, Mobile Telecommunications Networking, by Michael D. Gallagher and Randal A. Snyder, McGraw Hill, 1997, ISBN 0-07-063314-2, incorporated by reference herein. Particularly, the book treats techniques for interfacing a plurality mobile stations or instruments through base stations with the public switched telephone network. Generally as disclosed in the present system, the central stations C1-Cn can be related as base stations to function with the server S which as stated above may embody various wireless network structures.

Regarding another facet of mobile telecommunication, specifically fraud prevention, some aspects of the problem are facilitated by the system hereof. However, various security techniques are well known which may well be applicable to systems in accordance herewith. For example, U.S. Pat. No. 5,541,977 issued Jul. 30, 1996 to Hodges et al treats a system for the avoidance of wireless fraud. As another example, U.S. Pat. No. 5,450,479 issued Sep. 12, 1995 treats improved security for prepaid systems using telephone calling cards.

To consider the system of FIG. 3 further, the detailed telephone instrument TI1 (represented as a dashed-line block) shows representations of the earphone 20, the microphone 28, the antenna 14, the switch device 30 and the power supply or battery pack 38, all as generally described above. Furthermore, the power supply 38 is connected to a control unit 56 through the switch device 30. Otherwise, the electrical elements are connected directly to a transceiver 54. In that regard, the control unit 56 and the transceiver 54 are interconnected by a cable 58. Generally, the control unit 56 and the transceiver 54 (along with other elements described below) are contained in the electronics package 40 (FIG. 2). The transceiver 54 (FIG. 3) may take a form somewhat similar to units well known in contemporary wireless telephone systems. Functionally in the embodiment of FIG. 3, both digital and audio signals are transmitted by the transceiver 54; however, only audio is received as input.

The control unit 56 includes a memory 56A (ROM) primarily for storing identification data for the instrument along with control data for the control unit 56. Generally, the functions of the control unit 56 (treated below) are simple, involving the transmission of identification signals and sequencing the transmission and receipt of voice (audio) signals.

As indicated above, the wireless telephone instruments TI1-TIn may utilize currently well-known wireless techniques for communication with the central units C1-Cn. Communication is represented in FIG. 3 by wavy lines L1, L2 and Ln respectively. Such communication is from the antennas 14 of the instruments TI1-TIn through a central station antenna 60 to a wireless telephone platform 62. As suggested, the platform 62 incorporates substantial radio facility and is capable of accommodating broadcast communication with multiple calls simultaneously from the multiple instruments TI1-TIn.

The platform 62 may take the form of various structures as currently embodied in mobile base stations and is coupled to a control unit 64. Functionally, the control unit 64 sequences the operation of components in the central station C1, as disclosed below, basically to accomplish: screening wireless interfaces, informing and cuing callers, and to some extent, accomplishing the desired telephonic wireless connections and monitoring calls.

With approval, a call from the instrument TI1 is dialed up through the server S and the network N then bridged from the calling instrument TI1 to the terminal S1. As indicated, completed calls then are monitored to reflect service charges in the individual pre-paid balances of the wireless telephone instruments TI1-TIn which are kept at the central station C.

To accomplish the approval and routing functions of the central wireless station C, the control unit 64 is coupled to: a voice generator 66 (ARU), a voice recognition unit 68, a memory 70, operator terminal stations 72 (collectively represented) and finally, a network switching unit 74 connected through the server S to the public switched telephone network N. Some components of the central station C1 are well known. Specifically, voice generators are well known as in the form of Automatic Response Units (ARUs) which may include some additional capability and are widely used to cue callers in telephonic interface systems. The voice generator 66 is controlled by the control unit 64 as disclosed in detail below. Voice recognition units, as the unit 68, also are well known and have been developed to a attain a good level of reliably in identifying the spoken digits "zero" through "nine" in an audio form, even when communicated by telephone. For example, verbal recognition units providing an alternative to dual-tone multi-frequency (DTMF) signals are described in U.S. Pat. No. 5,509,060 issued Apr. 16, 1996 to Hall et al.

In the present system, being keyless, the callers essentially are cued by the voice generator 66 to speak numbers digit-by-digit as explained above. Such spoken numbers are individually recognized at the central station C by the voice recognition unit 68 and provided in a digital form for use as data or control signals.

The memory 70, in the central wireless station C, involves a substantial capacity and includes individual instrument cells 70A1-n (represented collectively) which are assigned respectively to the instruments TI1-TIn. For example, the cell 70A1 is allocated to the instrument TI1 and the cell 70An is allocated to the instrument TIn. Generally, an exemplary detailed format for the cells 70A1-70An is described below with reference to FIG. 5.

The memory 70 also includes a section 70B, which serves to indicate current connections of the instruments TI1-TIn, as for tracing on-line calls. Specifically, calls currently in process are stored to identify the individual wireless telephone instruments that are "connected" to terminals S1-Sn. Addressing the memory section 70B is on the basis of the telephone numbers of called terminals S1-Snn. This feature is treated in further detail below.

At this point it is to be generally understood that the memory 70 functions with the control unit 64 to: cue callers, store and implement approval or test criteria, maintain records of use history and values, and store messages, all to implement dial-up communication.

In some instances, a need may arise for direct personal communication between an individual at the station C1 and the user of a wireless instrument TI. For example, it may be desired to accommodate a user who has entered unresponsive information or has an urgent need for personal assistance. Alternatively, it may be desirable to confront a questionable user of an instrument with person-to-person communication. In some situations, as an emergency, an instrument user may be willing to incur a meaningful charge to speak directly with a live operator. To accommodate such operation, under certain circumstances, a user may be transferred to a live operator at one of the terminals 72. As well known, the terminals include a display screen for advising the operator of an instant situation to the extent of stored data.

The network switching unit 74 is a dial-up apparatus for operation with the server S to interface the network N. Accordingly, calls are placed or routed through the network N to a select one of the terminals S1 through Sn. The unit 74 operates with the control unit 64 and forms thereof are well known.

In view of the above descriptions, to further an understanding of the developed composite wireless system and the related operating processes, an assumed operating sequence will now be explained with reference to the various figures including the flow diagram of FIG. 4. Accordingly, assume a proper user, holding the wireless telephone instrument TI1 (FIGS. 1, 2 and 3) with a desire to establish telephonic communication with a telephone terminal S1 (FIG. 3).

At the outset, the assumed user withdraws the antenna 14 (FIG. 2) actuating the switch device 30 (FIG. 3) to energize the instrument TI1. The operation is indicated in FIG. 4 by an oval block 90 (upper left), designated "ON".

Figure 4:
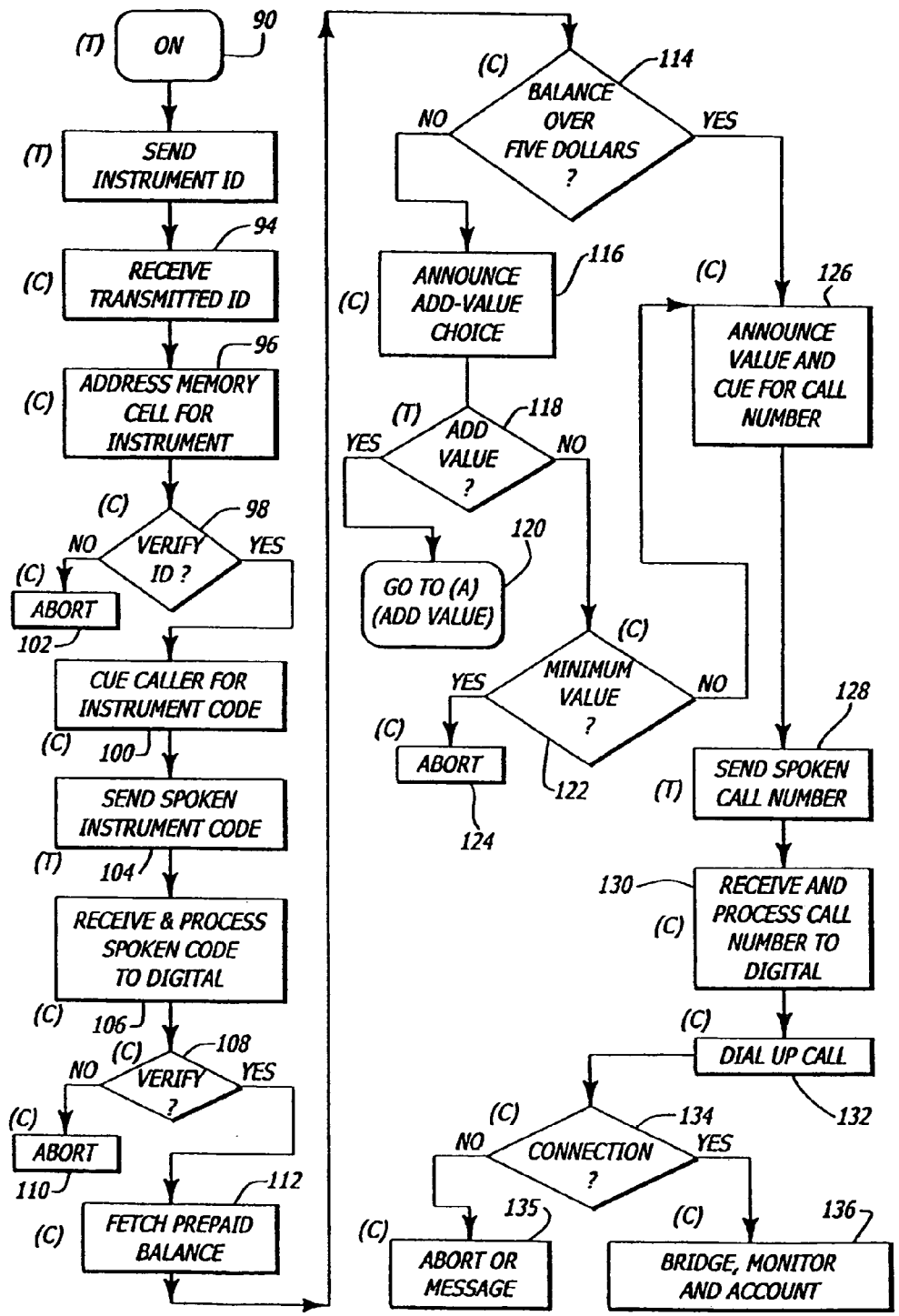
FIG. 4 is a flow chart detailing the operation of the system as depicted in FIG. 3.

Upon energization, the control unit 56 (FIG. 3, left) fetches the instrument's identification data from the memory 56A then actuates the transceiver 54 to broadcast signals representative of the instrument identification number, as indicated by the block 92 (FIG. 4). Note that in order to indicate the location of each operational step, as between the instrument TI1 and the central station C1, the blocks symbols in FIG. 4 are designated parenthetically either by a "T" (telephone instrument) or a "C" (central station C1).

The broadcast identification data from the instrument TI1 is received by the wireless platform 62 (FIG. 3, center) through the antenna 60 at the central wireless station C1 and passed to the control unit 64. The operation is represented in FIG. 4 by a block 94.

Upon receiving the identification data for the instrument TI1, the control unit 64 (FIG. 3) addresses a data cell 70A1 in the memory 70 serving the instrument TI1. The step is indicated by the block 96 (FIG. 4). Consequently, the data of the cell 70A1 is readily available.

As indicated above, details of the format for the exemplary cell 70A1 are treated below with reference to FIG. 5. However, for the present, it is important simply to understand that the control unit 64 fetches reference information or data from the memory 70, i.e. memory cell 70A1, to authenticate or verify that the instrument TI1 is proper as identified.

Various authentications or verifications may be involved, as discussed in greater detail below. However, at present, assume that the identification data coincides to reference data to authenticate the instrument TI1 as an instrument that is properly available for present use. Accordingly, a "yes" results from the query step as illustrated in FIG. 4 by a query block 98.

Note that a failure to verify the identification data for the telephone instrument TI1 (indicated by a "no" path from the query block 98) routes the operation to an "abort" block 102. It is to be recognized that several situations may result in an "abort" instruction. Of course, such occurrences may be handled differently and by various techniques. For example, a user simply may be informed that the instrument is not currently usable. Alternatives include tone signals, detailed explanations by the voice generator 66, and transfer to one of the terminals 72 for an operator interface.

Returning to the operative sequence, with verification of the instrument TI1 for use, the "yes" path from the query block 98 (FIG. 4) progresses to a block 100 indicating an operation by the control unit 64 (FIG. 3) to actuates the voice generator 66. Specifically, the user is prompted to speak the instrument code. For example, the voice generator 66 may be controlled to produce an audio message: "Please say your instrument code, slowly and digit by digit."

The audio message is broadcast by the wireless platform 62 to the transceiver 54 to actuate the earphone 20 with the cue. Responding to the cue, the user speaks the instrument code, e.g. "one, two, three, nine." See block 104, FIG. 4.

The spoken numbers are converted to audio signals by the microphone 28 (FIG. 3) and transmitted by the transceiver 54 to the wireless platform 62, see block 106, FIG. 4.

Receiving the instrument code "1239", it is verified by the control unit 64, as by comparison with a reference code stored in the instrument cell 70A1. Generally, the operation is similar to that of verifying the instrument identification, (explained above) as well as the widespread operation of testing a users personal identification number (PIN) which is variously executed in many forms of processors. However, note that the instrument code is associated with the instrument TI1, rather than with any person as in the case of a conventional PIN. PIN verification also could be utilized.

As suggested, other verifications may be involved as considered in detail below. In any event, the verification operation, performed by the control unit 64 (FIG. 3) is illustrated by a query block 108 (FIG. 4) and results in either a "yes" or a "no".

If the instrument code is not verified as proper, an abort operation results (block 110, FIG. 4). Alternatively, verification ("yes") advances the operation to a block 112 to initiate another testing step in the process. Specifically the control unit 64 (FIG. 3) determines whether the wireless telephone instrument TI1 has a critically-low pre-paid balance.

To perform the step, the control unit 64 again addresses the memory cell 70A1 for the instrument TI1 to obtain the current pre-paid credit or value held for the instrument. If the balance is critically low, the user may wish to add value, as by using a credit card.

The query block 114 (FIG. 4) tests the current pre-paid balance that is available for calls, e.g. "balance over five dollars?". Note that although values are treated in terms of dollars herein, such values are merely exemplary, recognizing that points, credits, and so on could be used to designate value.

In any event, the control unit 64 tests the current value against a critical minimum value to determine whether or not to inquire if the user wishes to increase the pre-paid value of the instrument. If so (yes) as illustrated by block 116, the user might be cued: "Your instrument now has a value balance of only four dollars and fifty cents, if you would like to increase the value by using a credit card, please say 'one'".

The query is resolved by the user's command, a illustrated by a query block 118. If the user wishes to increase the prepaid balance, the process advances to a sub-process as indicated by an oval block 120 (detailed below with reference to FIG. 4A). Otherwise, the process moves to another query block 122 representing another "test" step executed by the control unit 64 (FIG. 3). Specifically, the query is whether the instrument TI1 has sufficient current calling value to permit any call. If not, an abort is commanded as indicated by an abort block 124.

If the instrument has sufficient value i.e. an amount in excess of some minimum call value, the process moves to the step of block 126, which also indicates the step that follows a positive result from the test block 114 (balance over five dollars?). With the process advanced to the stage of proceeding with a call, the block 126 indicates cuing the user for the called number ("1 213 555 6666" for terminal S1). Additionally, the user is given the current pre-paid value for the instrument.

Specifically at this stage, the control unit 64 controls the voice generator 66 to cue the user. For example, the audio message transmitted to the user might take the form: "The present value of your instrument is sixty four dollars and fifty cents, please speak the number you are calling digit by digit."

At the instrument TI1, the user speaks the desired number to be called, e.g. "one, two, one, three, five, five, five, six, six, six, six." The spoken words impact the microphone 28 (FIG. 3) and are converted to audio signals that are broadcast by the transceiver 54 using the antenna 14. See FIG. 4, block 128.

The transmitted audio signals representative of the called number are received (FIG. 4, block 130) at the wireless central station C (FIG. 3) by the platform 62. Applied to the control unit 64, the signals are converted to a digital form then applied to the network switching unit 74 to accomplish a dial-up operation through the server S and the public switched telephone network N.

Using the multitude of capabilities and structures of the public switched telephone network N, a connection is sought with the terminal S1, see block 132, FIG. 4. Normally, the connection would be established and the user would hear a "ringing" tone. It may be the policy that the call would be charged only if communication is established. Accordingly, a query block 134, is illustrated. If the connection is not established, which might be determined by the user inactivating the instrument TI1, operation is aborted (block 135) with no action necessary.

Alternatively, if a connection is established (block 136, yes), the bridge between the instrument TI1 (FIG. 3) and the terminal S1 is completed with monitoring to determine charges for the call as indicated by the block 136. Essentially, when the communication is terminated, the time and charges for the call are reflected in the prepaid balance as stored in the memory cell 70A1 for the instrument TI1. These operations are executed between the control unit 64 and the memory 70.

In summary, FIG. 4 illustratively describes the process that is cooperatively executed by the control unit 56 in the wireless telephone instrument TI1 and the control unit 64 (in the central station C1).

Some ancillary sub-processes or process steps that may be incorporated in the system will next be considered. For example, the sub-process of adding value was mentioned above. Also, the system may incorporate a message capability somewhat akin to contemporary pager operation. Emergency access to a live operator also was mentioned above and is treated at a later point below. Aspects of fraud control also are treated below.

In the above description relating to FIG. 4, a point was reached (designated by the oval block 120) when a user indicated a desire to add value to the pre-paid balance. Essentially, the operation is to add value to the prepaid balance of the telephone instrument TI1, by incrementing the value stored in the memory cell 70A1. For example increments of either fifty or one hundred dollars might be selected.

The selected increment of value is reflected in the balance stored at the central station C1 (home station for the instrument TI1) and may be supported by a conventional credit card. In that regard, to support the credit card transaction, data in the form of the credit card number and expiration date may be sufficient. However, it is common practice additionally to require the card holders name or other data. As disclosed below, such additional data may be communicated in the form of audio signals representing words spoken by the user. Essentially, the control unit 64 accommodates recording such audio information.

Figure 4A:
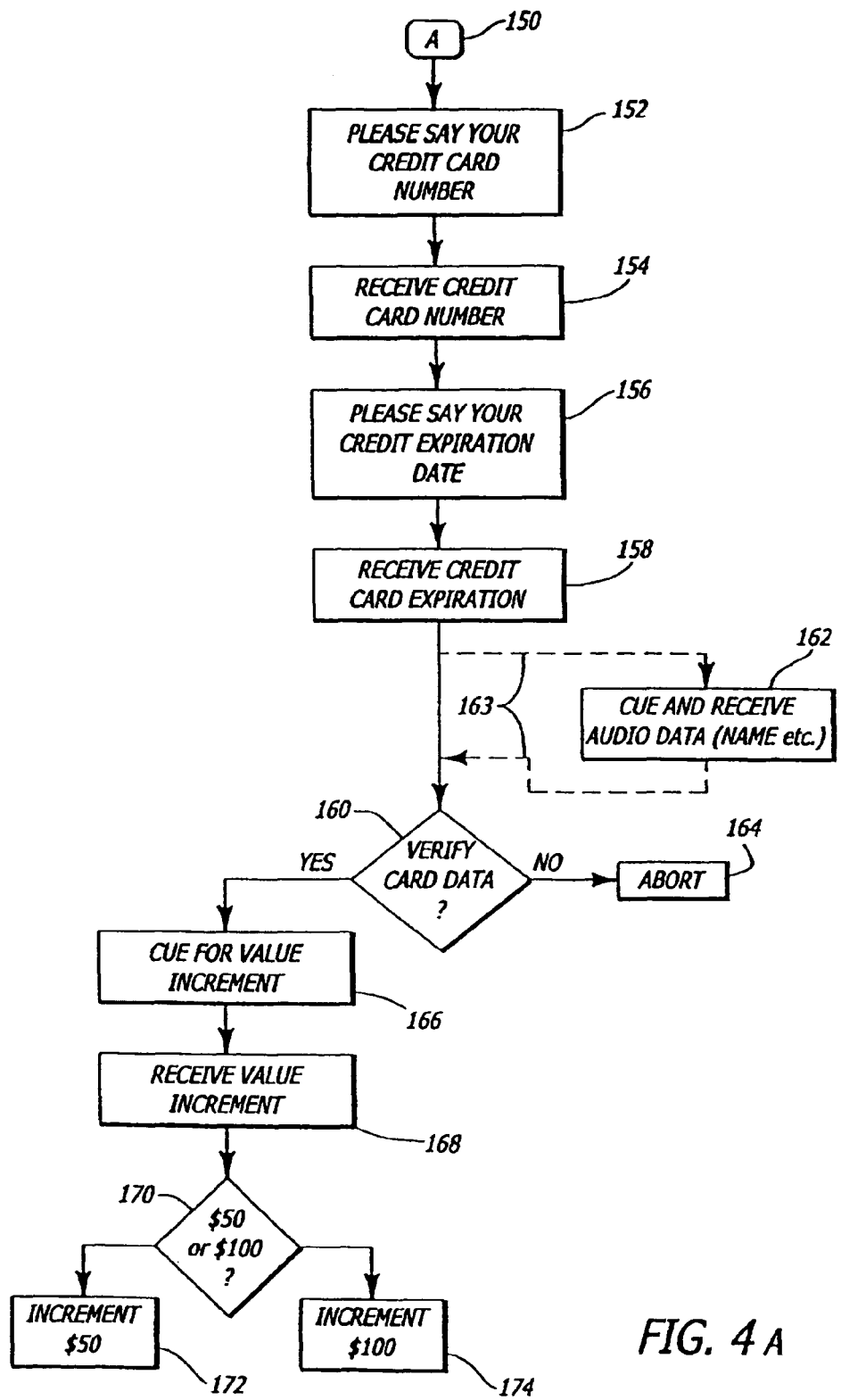
FIG. 4A is an extension of the flow chart of FIG. 4.

Considering the subprocess in detail, reference now will be to FIG. 4A showing an oval 150, designated by and "A" at the start (top). The initial step (block 152) of the sub-process involves cuing the user to state the number of the credit card supplying the increment of value. As described above, the number is spoken digit-by digit to be received, in audio form, at the control station C1 (block 154). As described above, the resulting audio signals are converted to digital number representations or signals for further processing.

In a similar fashion, the user is cued by the voice generator 66 to speak the card expiration date (block 156). Again, as described above, the date is spoken and received as audio signals then converted and processed as illustrated by a block 158.

The next step involves a query, as indicated by the block 160, unless the process encompasses taking alphabetic data, e.g. the user's "name", "address" and so on. In that event, a block 162, indicated as an alternative step by a dashed-line path 163, involves cuing, receiving and distinctly recording or processing such data, again in the form of audio signals. Such signals are treated differently. Rather than to be converted to digital representations, the audio signals representative of alphabetic words may be stored for processing which may involve subsequent consideration by a person.

In any event, the process next advances to the query block 160 mentioned above and indicating a test executed by the control unit 64 (FIG. 3) to verify the received data. If the data is only digital, verification typically would be on line. With verification, the transaction is approved. Otherwise, the process advances to the block 162 (FIG. 4Ad) indicating an abort of the communication.

Proceeding along the "yes" path from the query block 160, the next step is to cue the user for the value increment, e.g. "$50" or "$100"? The step is indicated by a block 166 and involves the user either speaking the digit "one" for a "$50" increment, or the digit "two" for an increment of "$100".

The spoken increment digit is received, as indicated by a block 168, converted to digital number signals and depending on the selected option is processed by recording the increment. As illustrated by a query block 170 and the alternative incrementing blocks 172 and 174 value is added to the prepaid balance. Thus, the final step is executed by the control unit 64 (FIG. 3) and the memory 70. Specifically, the memory cell 70A1 stores the prepaid value of the instrument TI1, which is thus incremented by the selected increment amount.

Reference has been made to the memory cells 70A1-n (FIG. 3, collectively represented) which are associated respectively with the individual instruments TI1-TIn. In that regard, depending on system design, regulatory provisions and operating formats, the content of the memory 70A may vary to a considerable extent. However, an exemplary format for the memory cell 70A1 is treated below and may typify each of the cells.

As indicated above, in the disclosed embodiment, each wireless telephone instrument TI1-TIn has identification data stored in the memory 70, including an identification number, for example, "2746832814" for the instrument T11. A detailed treatment of identification numbers for mobile instruments or stations is provided in the above-referenced book, Mobile Telecommunications Networking, specifically in a section beginning on page 64.

Recognizing that instruments in accordance herewith may be constructed and treated somewhat differently, it is to be recognized that the indicated number is merely illustrative and conventions, regulations and so on may command identification numbers or data in totally different forms with considerations as set forth in the referenced book.

Returning to the operations herein, the identification number is transmitted (broadcast) from an instrument (e.g. TI or TN) on its activation as identification data. On receipt, the number is used by the control unit 64 to address the memory 70 (FIG. 3) and accordingly locate a specific memory cell, e.g. cell 70A1 for the instrument TI1. Thus, the memory cells are addressed individually by the identification numbers as illustratively represented by an arrow 191 in FIG. 5 (upper left).

Figure 5:
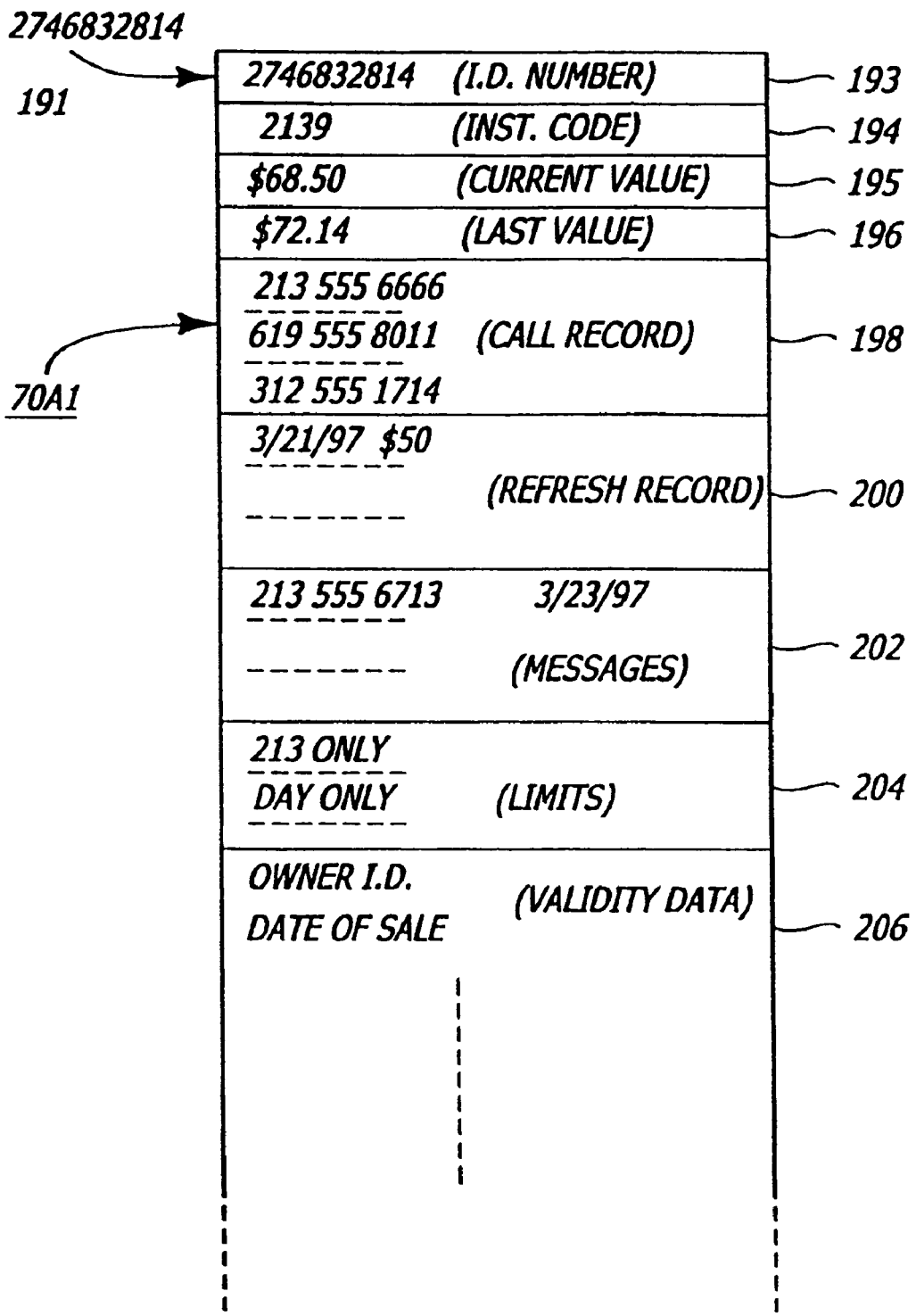
FIG. 5 is a symbolic diagram of a memory cell in the system of FIG. 3, for representing data on a wireless telephone instrument.

The exemplary cell 70A1 includes a number of individual fields horizontally arranged and shown separately in FIG. 5. At the top of the cell 70A1, as shown, a field 193 stores the identification number ("2746832814") for confirming addressing operations.

Next in order, a field 194 registers the instrument code, specifically a four digit number, e.g. 2139. The field 194 provides a reference for verification of the received instrument code that is tied to the instrument TI1 and provided by the user during each use to verify that the user is proper.

A pair of related fields 195 and 196 respectively store the current and last prior prepaid values of the instrument TI1. The current value, e.g. $68.50 is used for authorizing use and is reported to the user. The prior value is accessible to an operator, along with all fields of the cell for reference purposes, as at one of the operator terminals 72 (FIG. 3).

A series of similar fields 198 (FIG. 5) are collectively identified and store a record of the calls made by the instrument TI1. The fields 198 may be organized as a transient memory for some predetermined number of calls that were made most recently. For example, only the last twenty calls might be stored. Designation or target telephone numbers are illustrated for the three last calls made from the instrument TI1. Dates also may be recorded.

Another series of similar fields 200 also are collectively represented and provide a record of refreshed value increments. Specifically, incremental values and dates for adding value to the prepaid balance are stored as shown. Again, the storage may be transient covering some predetermined number of occasions.

As previously suggested, the system can receive and report messages via the instrument TI1. In that regard, messages are delivered only at a time when a telephone instrument TI is activated. Messages, in the form a telephone calling number and a date, are stored in a group of memory fields collectively designated as fields 202.

If message operation is provided, the process of FIG. 4 is modified to allow for delivery. Specifically, after the code verification step (FIG. 4, block 108) the user simply is advised that a message has been left and is given the calling number and date vocally. Once delivered, the messages in the fields 202 may be purged.

Another ancillary aspect of the disclosed system involves limitations that may be imposed individually on the use of each instrument, e.g. the instrument TI. Some examples will explain the structure and operation.

One expected widespread use of instruments in accordance herewith is by young students as in elementary school. With the defined risk of loss and the convenient physical form of instruments hereof, parents may wish to provide instruments to their children both for security and communication. To further limit the risk of loss, in accordance herewith use limitations can be imposed on the instruments.

Pursuing the example of a young student as the user, it might be presumed that proper use of the instrument TI1 would be restricted to a single dialing area. Accordingly, the use of the instrument can be so limited by storing the area code or codes that are approved for calls. Such limitations are stored in a group of fields 204 (FIG. 5) and are employed to indicate the approved use of the instrument.

To illustrate the accommodating sub-process step, the flow diagram of FIG. 4, would be modified simply by incorporating a further verification step similar to that of the block 108.

Thus a test or tests are performed by the control unit 64 (FIG. 3) as a part of the step represented by block 128 ("receive and process call number"). The test checks the called number against the reference area code numbers as stored in the fields 204 (FIG. 5).

Another limitation may be based on the time of day when calls can be made. For example, the day (twenty four hours) might be divided into four segments of six hours each called: "morning", "day", "evening" and "night". The instruments TI may then be restricted for use to any one or more of the segments. For example, an employee given the instrument TI1 might be restricted to using it only during the segments designated "morning" and "day". The approved six-hour segments are stored in the fields 204 and are imposed by verification processing in the control unit 64 (FIG. 3). For example, such verification may be a part of the process step 106 (FIG. 4).

Generally, attempted use of the telephone instrument TI1 that is outside the imposed limitations will be aborted in favor of a brief denial message. Thus, the risk of loss from clones is further reduced.

Returning to the memory cell 70A1 (FIG. 5) a group of fields 206 store various personal and statistical data on the assigned owner or user. Again, such information is displayed to an operator in the event of a transfer to one of the operator terminals 72 (FIG. 3). Often such data will be useful in communicating with users, as in the cases of interrupts or abort situations. Emergency data may be included, as for example, the home telephone number of a young person or that of a specific medical facility.

Another aspect of the present system involves emergency transfer to an operator at one of the terminals 72 (FIG. 3). As indicated above, the situation sometimes occurs when a user desperately wishes to speak directly with a person. To accommodate that situation, the present system accommodates a transfer command. In an exemplary operation, a user indicates the desire to communicate with a person by speaking a "transfer" code, e.g. "three", "three", "three" "three" - - - "three" and so on. The sequence is detected as the unique transfer code by the control unit 64 and the user is transferred to one of the operator terminals 72. A charge may be involved.

As mentioned above, the problem of cloning may be variously combatted, however, another aspect hereof may be utilized in that regard. A counter, in the control unit 64 (FIG. 3), indicates a specific number for each call received on each line or port of the platform 60. For example, the counter might indicate any of the numbers: "one", "two" or "three" on each line for each incoming call. The received number selectively commands the control unit 64 to broadcast a burst signal of a predetermined frequency to the calling instrument. That is, three different frequencies are indicated by the three different counter numbers respectively.

Upon receiving the burst signal, the wireless telephone instrument replies with an associated number, e.g. a four digit number. The same associated number is stored as a reference by the memory 70, for example, in each of the unit cells 70A1-$n$ identified with the calling instrument TI1.

The received and reference numbers are compared by the control unit 64 to condition calls. In the case of coincidence, the call proceeds, the operation being completely transparent to the user. Alternatively, if the response number does not coincide to the reference number, the call is denied. Accordingly, identification of the individual wireless telephone instruments TI is confirmed dynamically.

The additional verification operation involves a relatively minor addition to the instruments TI1-$n$ in the form of filters to identify the frequency of each received burst signal and the capability to fetch the specified number from the read-only memory 56A. In that regard, frequency decoding in telephonic systems is well known and described for example in a U.S. Pat. No. 4,320,256 to Freeman, and entitled Verbally Interactive Telephone Interrogation System With Selectible Variable Decision Tree.

In view of the detailed descriptions set out above, the structure and operation of the system to execute effective communication processes will be apparent. However, a few additional comments may be appropriate in relation to applications for the system. The case of a young student was considered above and is here emphasized in the interests of security and communication. Telephones are often unavailable when most needed and in the case of young people, the need may be extreme.

The same features that render an instrument in accordance here with suitable for a young person also are present for numerous other applications. Specifically, reduced risk of loss, minor complications of ownership and considerable convenience for storage render such instruments practical for travelers, automotive use, employee assignment, pager users, and a host of others.

To consider the procurement of the instrument, a purchaser might take delivery with only minimal formality. Essentially, the instrument would be given an identification number and an instrument code, (no effective call number) both being stored in the memory 56A and a related one of the cells 70A1-n. That is, essentially the instrument would not carry a usable call or directory number. Note that as stated in the above-referenced book (Mobile Telecommunications Networking): "From an IS-41 protocol perspective, the MIN is purely the unique identifier of a mobile subscriber and subscription. In most implementations today, the MIN is usually the dialable directory number of the MS as well. However, this is not a requirement, and the MIN is not specified as the subscriber's directory number in IS-4-C." Accordingly, as illustrated by FIG. 5, herein, identification numbers are stored, however, effective call or directory numbers (for dial-up calls, as from terminal S1-Sn) are not. A prepaid amount would be paid and recorded in the assigned cell. Basic owner data also may be required and stored in the group of fields 206 (FIG. 5); otherwise, complications are minimal. The owner is not obligated for unlimited calls. Credit information or standing is unnecessary. Billing details are avoided. The complications are relatively few. The convenience is relatively good and the risk of loss is relatively small.

In view of the above explanations of exemplary systems and processes, it will be apparent the other embodiments and processes may be employed utilizing the developments hereof. Accordingly, the appropriate scope hereof is deemed appropriately determined on the basis of the claims as set forth below.

The invention claimed is:

1. A process of mobile wireless telephone communication for individual callers to contact remote telephone terminals through a central wireless station, a server and a public switched telephone network, comprising the steps of:

providing the individual callers with keyless wireless mobile telephone instruments including, transceiver apparatus for wireless telephonic communication, a manual activation switch, transducer apparatus for voice interface and a control unit for transmitting identification data for a keyless wireless mobile telephone instrument on activation by said manual activation switch to place a call and with cues for, and voice entry of a call number, to transmit calling signals to initiate a call;

providing a central station for wireless communication with said keyless wireless mobile telephone instruments operating on activation of said manual activation switch at a keyless wireless mobile telephone instrument functioning to receive identification signals and to cue for calling signals to selectively bridge an activated keyless wireless mobile telephone instrument through the central wireless station, a server and the public switched telephone network to a remote telephone terminal for communication, said central station selectively limiting the extent of use by the activated keyless wireless mobile telephone instruments as identified, based on a prepaid calling value subject to additions.

2. A process according to claim 1 wherein the limiting of use is further based on instrument authentication or verification for proper use.

3. A process according to claim 1 wherein the limiting of use is further based on dialing area.

4. A process according to claim 1 wherein the limiting of use is further based on time of day.

5. A process according to claim 1 wherein the limiting of use is further based on a prepaid monetary value stored by the central station.

6. A process according to claim 5 wherein the central station may be actuated to interface a keyless wireless mobile telephone instrument to increment the monetary stored value.

7. A process according to claim 1 wherein the provided central station further includes a memory for storing data on the keyless wireless mobile telephone instruments including a prepaid value.

8. A process according to claim 1 wherein the provided central station further includes a memory for storing data on the keyless wireless mobile telephone instruments including a record of data on calls made by keyless wireless mobile telephone instruments.

9. A process according to claim 1 wherein the provided central station further includes a memory for storing data on the keyless wireless mobile telephone instruments including messages.

10. A process according to claim 1 wherein the provided central station further includes a memory for storing data on the keyless wireless mobile telephone instruments including a record of personal data on an assigned user of the instrument.

11. A process using a central station for interfacing a plurality of keyless mobile telephone instruments through a public switched telephone network to communicate with remote terminals, comprising the steps of:

sensing the activation of a keyless mobile telephone instrument by a manual switch, thereby indicating a desire by a user to interface a select remote terminal and to activate voice interface and transmit identification data;

receiving a prompted user spoken telephone calling number at an activated keyless mobile telephone instrument to formulate representative calling number signals for a select remote terminal;

transmitting the representative calling number signals to a central station;

at the central station, receiving the representative calling number signals;

connecting the activated keyless mobile telephone instrument to the public switched telephone network and supplying dial-up calling number signal indicative of the representative calling number signals, to the public switched telephone network to dial-up the select remote terminal; and limiting the use of the keyless mobile telephone instruments in accordance with prepaid use for the mobile telephone instruments by maintaining individual balances of use for the keyless mobile telephone instruments subject to increasing and decreasing value.

12. A process according to claim 11 wherein the step of limiting the use of a keyless mobile telephone instrument comprises maintaining individual records of use for the keyless mobile telephone instruments.

13. A process according to claim 11 wherein the central station comprises a cellular central station and a server.

14. A process according to claim 11 wherein the dial-up calling number signals comprise DTMF calling signals.

15. A system of mobile telecommunication through a public switched telephone network, comprising:
   a plurality of keyless, wireless mobile telephone instruments including, a manual activation switch to activate operation of an instrument, a transceiver for wireless communication, transducer apparatus coupled to the transceiver for enabling a user to receive vocal transmissions and to provide vocalized calling signals, and a control unit coupled to said transceiver and said transducer apparatus, said control unit operable for an activated keyless wireless mobile telephone instrument to control on activated operation to transmit an identification signal: the reception of vocal cues, the transmission of vocalized calling signals, responsive to said vocal cues, for a select remote telephone terminal and to sequence the voice interface operation of an activated keyless wireless mobile telephone instrument to accomplish telephonic communication with said select remote telephone terminal;
   a central station including wireless apparatus for communication with activated keyless wireless mobile telephone instruments including control apparatus to accordingly connect such an instrument through a public switched telephone network to said select remote telephone terminal; and
   memory capability for storing prepaid calling balances for the keyless, wireless mobile telephone instruments to limit the use thereof and to account for calls.

16. A system according to claim 15 wherein said memory capability further includes a capability to add value to said balances.

17. A system according to claim 15 wherein said memory capability is remote from said keyless, wireless mobile telephone units.

18. A system according to claim 17 wherein said memory capability is addressed by said identification data to access prepaid calling balances.

19. A system according to claim 17 wherein said memory is located at said central station.

20. A system according to claim 15 wherein said memory capability accounts for use of said keyless, mobile wireless telephone instruments in units of monetary value.

21. A system according to claim 15 wherein said calling signals are converted to DTMF signals.

22. A system according to claim 21 wherein said calling signals are converted to DTMF signals at said central station.

23. A mobile wireless telephone system for enabling users to communicate with remote terminals via the public switched telephone network by voice dialing to attain a connection, comprising:
   keyless mobile wireless telephone instruments having a memory to store individual identification data and further including a transceiver with transducers for converting received spoken sounds to representative signals and converting received spoken word signals to vocalized words, the mobile wireless telephone instruments further including a control with a manual switch to activate a mobile wireless telephone instrument to transmit representations of the individual identification data, and to provide voice recognition operation identified with transmitted individual identification data for the active mobile wireless telephone instrument;
   a central station for wireless communication with the keyless mobile wireless telephone instruments to attain a connection to a select remote terminal for an active keyless mobile wireless telephone instrument and including, a memory to store individual prepaid call balances for the mobile wireless telephone instruments, a communication platform with control for communication with active mobile wireless telephone instruments to receive individual identification data from an active mobile wireless telephone instrument and thereby verify the sufficiency of the prepaid call balance for a call, the central station further including controlled voice activation capability to cue a verified active mobile wireless telephone instrument and to receive representations of a spoken call number, to dial up the call number through the public switched telephone network and to bridge the dialed connection to the active mobile wireless telephone instrument.

24. A mobile wireless telephone system according to claim 23 wherein the mobile wireless telephone instruments further include a signal device to indicate the occurrence of an incoming call.

* * * * *